Nov. 1, 1932.                    R. THOMSON                    1,886,272
                                   PLIERS
                         Original Filed April 17, 1931
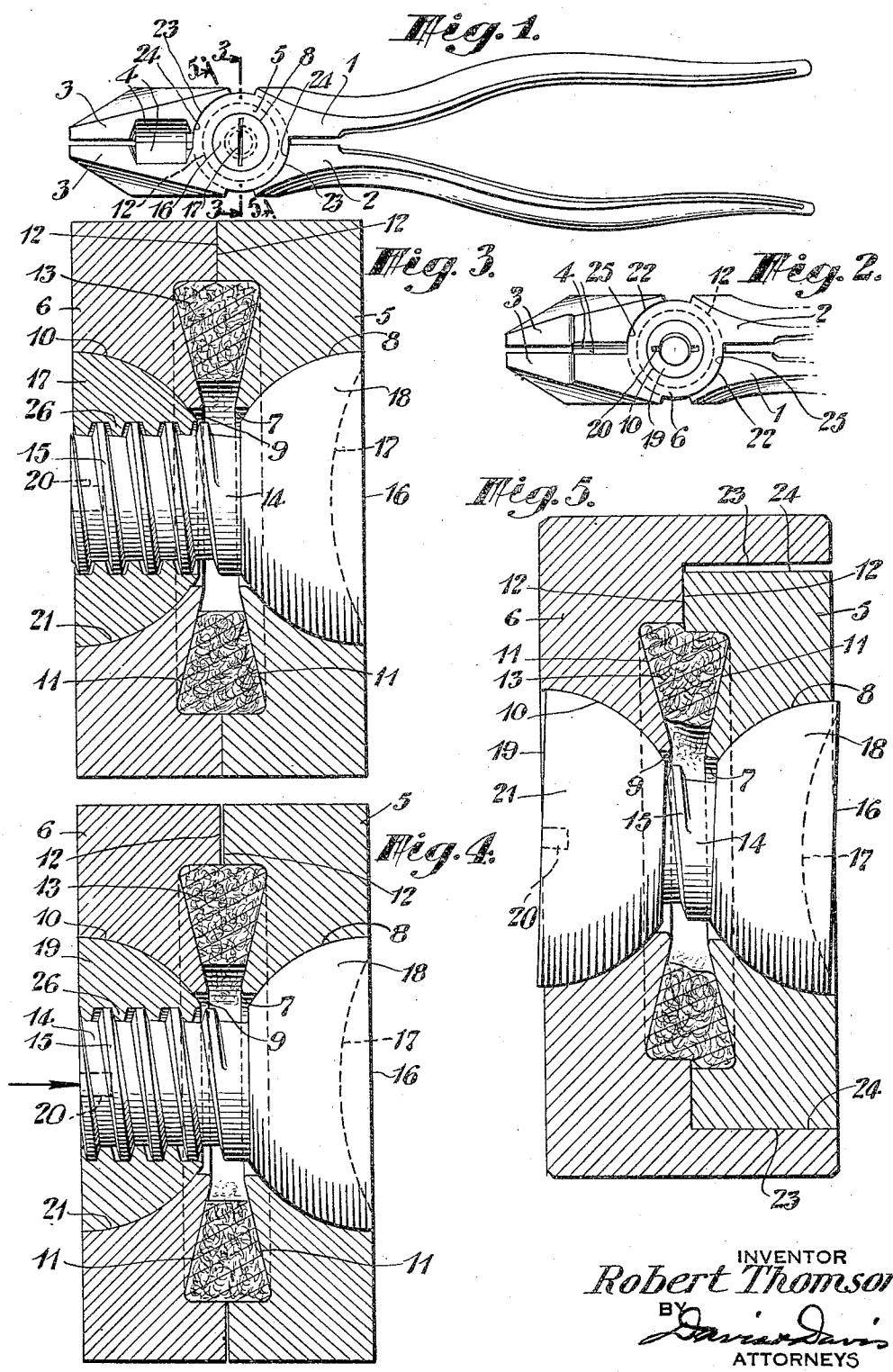
INVENTOR
Robert Thomson
BY
Davis Davis
ATTORNEYS Patented Nov. 1, 1932

1,886,272

UNITED STATES PATENT OFFICE

ROBERT THOMSON, OF ARLINGTON, NEW JERSEY, ASSIGNOR TO DARDELET THREAD-LOCK CORPORATION, OF NEW YORK, N. Y., A CORPORATION OF DELAWARE

PLIERS

Application filed April 17, 1931, Serial No. 530,803. Renewed August 6, 1932.

Important objects of the present invention are, to provide an improved pivotal connection designed to reduce wear and strain upon the pivot; to provide a pivotal connection of improved design for tools such as pliers, shears, or the like; to provide such a pivotal connection designed for ready self-adjustment of the pivot to certain inaccuracies in the pivoted members and for prevention of strain upon the pivot and impairment of the operation of the tool; to provide such a pivotal connection embodying a floating pivot of improved design capable of self-adjustment to accommodate it to inequalities, want of alinement and lateral shift of the pivoted parts, in combination with reaction means independent of the pivot for taking lateral thrust and relieving the pivot of strain; to provide such a pivotal connection wherein the floating, self-adjusting pivot has spherical heads and the pivoted members have concave, spherical seats in which said heads are fitted for universal rotation; to provide such a pivotal connection embodying a thoroughly reliable, self-locking thread feature; to provide such a pivotal connection designed for ready and easy connection of its parts, accurate adjustment to take up wear and secure maintenance of adjustment; and to provide other improved features of design which will appear hereinafter.

In the drawing, Fig. 1 is a side view of a combined pliers and shears, or nippers, embodying my invention;

Fig. 2 a fragmentary view of the opposite side of the tool;

Fig. 3 an enlarged transverse section taken on the line 3—3 of Fig. 1 showing a preliminary adjustment of the parts in the course of assembling them;

Fig. 4 a view similar to Fig. 3 showing the final adjustment of the working parts; and Fig. 5 an enlarged section taken on the line 5—5 of Fig. 1, showing the pivoted members displaced slightly, with the floating pivot tilted and certain of the reaction surfaces in engagement.

My improved pivotal connection is shown as embodied in an electrician's tool designed to serve as a combined pliers and shears, or nippers. The pivotal connection may, however, be satisfactorily employed in a great variety of tools and mechanisms.

The tool is of approximately standard form. It comprises two pivoted members 1 and 2 formed at one end with opposed plier jaws 3 and formed, inwardly of said jaws, with opposed shearing or nipping blades 4. The medial portions of the members 1 and 2 are crossed for pivotal connection and extend beyond their intersection to form the usual handles. At their intersection the members 1 and 2 are formed respectively with flat, disk-like hub portions 5 and 6. These hubs are of material diameter and they are disposed face to face. Hub 5 is centrally formed with a pivot aperture 7 and a concave pivot head seat 8 countersunk in the outer face of the hub. Hub 6 is similarly formed with a pivot aperture 9 registering with aperture 7, and a concave pivot head seat 10 countersunk in the outer face of the hub. The seats 8 and 10 are substantially hemispherical. At its inner face each hub is formed with a shallow, circular depression 11 immediately surrounding its central aperture. Immediately outward of said depressions the inner faces of the hubs form flat, narrow bearing surfaces 12 surrounding the recesses and spaced radially a material distance from the pivot apertures. The bottoms of the depressions slope inward in opposite directions but are slightly out of contact around the pivot apertures. The depressions register and combine to form a recess in which a lubricant-containing washer or gasket 13 is confined.

The hubs 5 and 6 are pivotally secured together by a bolt. The latter has a shank 14 formed with a thread 15, and with a head 16. Said shank extends through the registering apertures 7 and 9 and its diameter is materially less than that of the apertures. The head has a flat outer face, slotted as at 17 to receive a screw driver, and a substantially hemispherical inner face 18 rotatably fitted in one of the concave seats of the pivoted members. Screwed upon the bolt shank is a nut 19 also having a flat outer face slotted, as at 20, for receiving a screw driver or spanner, and a substantially hemispherical inner face 21 rotatably fitted in the other of said concave seats. The concave seats and the hemispherical bolt head and nut faces are preferably all struck with the same or substantially the same radius, and the centers of curvature of the concave seats are so spaced that the opposed curvatures of the two seats are substantially tangential at a point upon the pivot axis midway between the seats. The pivot heads represented by the bolt head and nut are fitted for universal rotation in the concave seats, and the latter, together with the hemispherical surfaces of the pivot heads and the bearing surfaces 12, are finished and lapped to reduce friction to a minimum.

At diametrically opposite points of its hub portion 5 the pivoted member 1 is formed with arcuate reaction or bearing surfaces 22 and the member 2 is formed with similar surfaces 23 circumferentially staggered upon its hub portion with relation to the surfaces 22. Said surfaces 22 and 23 are concentric with the pivot apertures 7 and 9 respectively and radially located directly outward of the bearing surfaces 12. Arcuate peripheral surfaces 24 upon the hub 5 are opposed to the surfaces 23 and engageable with them. Similar peripheral surfaces 25 upon the hub 6 are opposed to the surfaces 22 and engageable with them. Said surfaces 24 and 25 are concentric with the pivot apertures 7 and 9 respectively and, together with the reaction surfaces 22 and 23 opposed thereto, they are finished to reduce friction.

The bolt thread 15 and the engaged thread 26 of the nut are complementary threads of constant pitch and, as shown, are preferably the well known self-locking Dardelet type of screw threads shown in Patent No. 1,657,244. The crest of thread 26 and the root of thread 15 slope inward toward the bolt head and make an angle of preferably six degrees with the thread axis, this angle being within the angle of friction for metals. The ribs of the threads are much narrower than the grooves so that the threads are relatively displaceable one across the other for self-locking mutual engagement.

The parts of the tool are assembled by placing the washer 13, saturated with oil, in one of the hub depressions 11 and bringing the hubs 5 and 6 together with the apertures 7 and 9 in register. Then the shank of the pivot bolt is inserted through said apertures and the nut 19 is screwed thereon until the hemispherical faces of the bolt head and nut are fully seated and the opposed bearing surfaces 12 are drawn firmly together. This stops axial relative advance of the bolt and nut and, upon further turning of the screw, the threads are displaced crosswise of each other to bring the sloping crest and root locking surfaces into partial wedging self-locking engagement, as shown in Fig. 3. Then the exposed end of the bolt shank is tapped to drive the pivot bolt axially in a reverse direction to that of its insertion. This completes the tight-holding wedging engagement of the threads and brings opposed faces thereof into abutment, as shown in Fig. 4. At the same time said slight axial reverse movement of the bolt serves to relieve the pressure upon the opposed bearing surfaces 12 and permit the pivoted members to pivot easily.

The design of the pivot structure, with its hemispherical pivot heads fitted in hemispherical seats for universal rotation, renders the pivot floating and self-adjusting to compensate for inaccuracies in the workmanship of the various parts, relieves the pivot of strain, and prevents binding action at the pivot. If, for example, the pivot aperture in either of the hub portions is not accurately centered so that it fails to accurately aline with the registering aperture in the other hub portion, the pivot is free to tilt or cant and accommodate itself to the inaccuracy. In the tilted position of the pivot the pivot heads still have perfect hemispherical pivotal engagements with their seats and avoid point contact and consequent wear and binding effect. The floating pivot will also freely accommodate itself to other inaccuracies such as a lack of true perpendicularity of the bearing surfaces 12 to the axes of the pivot apertures and seats, or the presence of foreign matter between the surfaces 12 causing relative tilting of the hubs. Also, in the use of the tool, slight relative displacements of the hubs will occur laterally of the pivot as shown in Fig. 5, as there is slight working clearance between the reaction surfaces 22 and 23 and the peripheral hub surfaces 24 and 25. The floating pivot will accommodate itself freely to these displacements. At the same time the said reaction surfaces will take the lateral thrust and relieve the floating pivot of pressure. This, in addition to preventing binding action and objectionable wear at the pivot, relieves the latter of strains tending to unscrew the nut. The combination of the improved floating, self-adjusting pivot with said reaction-taking means independent of the pivot is an important feature of the invention.

The design of the pivotal connection provides for quick and easy assembly, accurate working adjustment of the pivoted parts, easy re-adjustment to take up wear, accommodation to inaccuracies of workmanship without impairment of operation, prevention of strain upon the pivot and prevention of unscrewing of the nut. Proper lubrication of the entire pivot joint is also provided for. The washer 13 is disposed and held in a manner to supply oil at the proper rate to both of the pivot heads and their seats and to the bearing surfaces also. From the bearing surfaces 12 the oil may also pass outward to the reaction surfaces 22 and 23 and to the peripheral hub surfaces opposed thereto, since the reaction surfaces extend outward directly from the surfaces 12.

What I claim is:

1. A tool of the character described comprising a pair of pivoted members having hub portions formed with registering pivot apertures and having concave, spherical pivot head seats at the outer faces of the hub portions; and a pivot comprising a bolt having a threaded shank inserted through said registering apertures and a head having a convex, spherical inner face fitted for universal rotation in one of said concave seats, and a nut screwed upon the bolt shank and having a convex, spherical inner face fitted for universal rotation in the other concave seat, the pivot being universally tiltable without binding effect by rotation of said convex faces in the seats, to accommodate itself to want of alinement of the seats.

2. A tool of the character described comprising a pair of pivoted members having hub portions formed with registering pivot apertures and having concave, spherical pivot head seats at the outer faces of the hub portions; a pivot bolt having a threaded shank inserted through said registering apertures and a head having a convex, spherical inner face rotatably fitted in one of said concave seats, and a nut screwed upon the bolt shank and having a convex, spherical inner face fitted in the other of said concave seats, the engaged threads of the bolt and nut having clearance for transverse relative displacement and being formed to co-act for self-locking mutual engagement by relative axial shifting of the pivot bolt in an opposite direction to that of its insertion.

3. A tool of the character set forth comprising a pair of pivoted members having hub portions formed with registering pivot apertures and having concave spherical pivot head seats at the outer faces of the hubs; a pivot inserted through said apertures and having heads formed with opposed inner, convex, spherical faces fitted in said concave seats for universal rotation, the pivot being tiltable to a limited degree to accommodate itself to want of alinement of the seats; and reaction means carried by the pivoted members and independent of the pivot to limit lateral relative displacement of the hub portions and prevent strain upon the pivot.

4. A tool of the character described comprising a pair of pivoted members having hub portions formed with registering pivot apertures and having concave, spherical pivot head seats at the outer faces of the hub portions; and a pivot comprising a bolt having a threaded shank inserted through said registering apertures and a head having a convex, spherical inner face fitted for universal rotation in one of said concave seats, and a nut screwed upon the bolt shank and having a convex, spherical inner face fitted for universal rotation in the other concave seat, the registering apertures affording clearance around the bolt shank, and the concave seats and concave bolt head and nut faces cooperating with said clearance to permit tilting of the pivot relatively to the hub portions and limited relative lateral displacement of the latter without biting engagement of the hub portions with the pivot; and reaction means carried by the hub portions and independent of the pivot to limit relative lateral displacement of the hub portions and prevent lateral strain upon the pivot.

5. A tool of the character described comprising a pair of pivoted members having hub portions formed with registering pivot apertures and having concave, spherical pivot head seats at the outer faces of the hub portions; and a pivot comprising a bolt having a threaded shank inserted through said registering apertures and a head having a convex, spherical inner face fitted for universal rotation in one of said concave seats, and a nut screwed upon the bolt shank and having a convex, spherical inner face fitted for universal rotation in the other concave seat, the pivot being universally tiltable without binding effect by rotation of said convex surfaces in the seats, to accommodate itself to want of alinement of the seats; and opposed, arcuate reaction surfaces carried by the hub portions, radially spaced outward from the pivot and substantially concentric with it and mutually engageable to limit relative lateral displacement of the hub portions and prevent lateral strain upon the pivot.

6. A tool of the character described comprising a pair of pivoted members having medial portions formed with registering pivot apertures and having concave, spherical pivot head seats at the outer faces of said medial portions; and a pivot comprising a bolt having a threaded shank inserted through said registering apertures and a head having a convex, spherical inner face fitted for universal rotation in one of said concave seats, and a nut screwed upon the bolt shank and having a convex, spherical inner face fitted for universal rotation in the other concave seat, the registering apertures affording clearance around the bolt shank, and the concave seats and concave bolt head and nut faces cooperating with said clearance to permit limited tilting of the pivot relatively to the hub portions and lateral displacement of the latter without biting engagement of the hub portions with the pivot; and opposed, arcuate reaction surfaces carried by the hub portions, radially spaced outward from the pivot and substantially concentric with it and mutually engageable to limit relative lateral displacement of the hub portions and prevent lateral strains upon the pivot, the engaged threads of the bolt and nut having clearance for transverse relative displacement and being formed to co-act for self-locking mutual engagement by said displacement.

7. A pivotal connection comprising a pair of pivoted members having portions opposed face to face and formed with registering pivot apertures and having concave, spherical pivot head seats at their opposite outer faces; a pivot extending through said apertures and having heads formed with opposed inner, convex, spherical faces fitted in said concave seats for universal rotation, the pivot being tiltable to permit lateral displacement of the pivoted members relatively to each other; reaction means carried by the members and independent of the pivot to limit lateral displacement of the members and prevent strain upon the pivot; opposed, contacting bearing surfaces formed upon the opposed faces of the pivoted portions, surrounding the pivot and spaced radially therefrom, said opposed faces having registering depressions surrounding the pivot inwardly of said bearing surfaces and forming a recess; and a lubricating packing in said recess.

8. A pivotal connection comprising a pair of pivoted members having their pivoted portions formed with registering pivot apertures and having concave, spherical pivot head seats at their outer faces; and a pivot comprising a bolt having a threaded shank inserted through said registering apertures and a head having a convex, spherical inner face fitted for universal rotation in one of said concave seats, and a nut screwed upon the bolt shank and having a convex, spherical inner face fitted for universal rotation in the other concave seat, the engaged threads of the bolt and nut having clearance for transverse relative displacement and being formed to co-act for self-locking mutual engagement by said displacement, and the pivot being universally tiltable without binding effect by rotation of its convex faces in their seats, to accommodate itself to want of alinement of the seats.

9. A pivotal connection comprising a pair of pivoted members having their pivoted portions formed with registering pivot apertures and having concave, spherical pivot head seats at their outer faces; and a pivot comprising a bolt having a threaded shank inserted through said registering apertures and a head having a convex, spherical inner face fitted for universal rotation in one of said concave seats, and a nut screwed upon the bolt shank and having a convex, spherical inner face fitted for universal rotation in the other concave seat, the pivot being universally tiltable without binding effect by rotation of said convex surfaces in the seats to accommodate itself to want of alinement of the seats; and opposed, arcuate reaction surfaces carried by the pivoted portions, radially spaced outward from the pivot and substantially concentric with it and mutually engageable to limit relative lateral displacement of the pivoted portions and prevent lateral strain upon the pivot.

10. A pivotal connection comprising a pair of pivoted members having pivoted portions formed with registering pivot apertures and having concave, spherical pivot head seats at the outer faces thereof; a pivot extending through said apertures and having heads formed with opposed inner, convex, spherical faces fitted in said concave seats for universal rotation, the pivot being tiltable to accommodate itself to want of alinement of the seats; and reaction means carried by the pivoted members independently of the pivot and radially spaced therefrom to limit relative lateral displacement of the pivoted portions and prevent strain upon the pivot.

11. A pivotal connection comprising a pair of members pivoted together, the pivotal portions of said members having registering pivot apertures and concave, spherical pivot head seats countersunk at their outer faces; and a pivot comprising a bolt having a threaded shank inserted through said registering apertures and a head having a convex, spherical inner face fitted in one of said concave seats, and a nut screwed upon the bolt shank and having a convex, spherical inner face fitted in the other concave seat; and means to lock the nut against rotation on the bolt, the pivot being universally tiltable by rotation of said convex faces in the seats, and the pivoted portions of said pivoted members being slightly shiftable relatively to each other transversely of the pivot.

In testimony whereof I hereunto affix my signature.

ROBERT THOMSON.